United States Patent [19]

Eriksson et al.

[11] Patent Number: 5,521,904

[45] Date of Patent: May 28, 1996

[54] METHOD AND APPARATUS FOR TESTING A BASE STATION IN A TIME DIVISION MULTIPLE ACCESS RADIO COMMUNICATIONS SYSTEM

[75] Inventors: Mats E. Eriksson, Boden; Hans L. Rinnbäck, Järfälla; Håkan O. Djuphammar, Stockholm; Olov T. Edler, Spånga, all of Sweden; Sven E. Nilsson, Dallas, Tex.

[73] Assignee: Telefonaktiebolaget LM Ericsson, Stockholm, Sweden

[21] Appl. No.: 162,604

[22] Filed: Dec. 7, 1993

[51] Int. Cl.⁶ ........................................ H04J 3/14
[52] U.S. Cl. .............. 370/15; 370/17; 370/95.3; 455/67.1; 455/67.4; 371/20.5
[58] Field of Search .................. 370/13, 15, 17, 370/95.3; 455/67.1, 67.4; 371/20.4, 20.5

[56] References Cited

U.S. PATENT DOCUMENTS

| | | | |
|---|---|---|---|
| 4,361,904 | 11/1982 | Matsumura | 455/67 |
| 4,491,973 | 1/1985 | Idol | 455/115 |
| 4,656,651 | 4/1987 | Evans et al. | 379/1 |
| 4,688,208 | 8/1987 | Kawaguchi | 370/15 |
| 4,860,281 | 8/1989 | Finley et al. | 370/15 |
| 5,077,783 | 12/1991 | Leppänen | 379/27 |
| 5,109,535 | 4/1992 | Kume et al. | 455/67.4 |
| 5,291,475 | 3/1994 | Brukkert | 370/95.3 X |
| 5,337,316 | 8/1994 | Weiss et al. | 371/20.5 |

FOREIGN PATENT DOCUMENTS 2256776 12/1992 United Kingdom ........... H04B 17/00

Primary Examiner—Douglas W. Olms
Assistant Examiner—Russell W. Blum
Attorney, Agent, or Firm—Burns, Doane, Swecker & Mathis

[57] ABSTRACT

In a base station of a mobile cellular telephone system of the type having time division multiple access (TDMA) channels, a radio frequency test loop is established between a predetermined downlink channel of a base station transmitter and a predetermined uplink channel of a base station receiver. The test loop is in real time, thereby eliminating the time offset of the radio channels used for communications. The radio frequency test loop includes a circuit for transposing the frequency of the carrier signal from the transmitter to a frequency that can be received by the receiver. The signal having the transposed frequency is used in tests for determining values such as bit error rate (BER), transmission signal level, or reception sensitivity.

26 Claims, 6 Drawing Sheets

METHOD AND APPARATUS FOR TESTING A BASE STATION IN A TIME DIVISION MULTIPLE ACCESS RADIO COMMUNICATIONS SYSTEM

FIELD OF THE INVENTION

The present invention relates to the testing of a base station in a radio communications system, and more particularly, to the testing of a base station of a cellular radio telephone system having time division multiple access (TDMA) channels.

BACKGROUND OF THE INVENTION

In order to fully test the radio equipment of a cellular telephone system, some type of radio test equipment is employed. In the testing of a base station of an analog cellular radio telephone system, a radio test loop is normally established between a base station transmitter and a corresponding base station receiver that are ordinarily used for traffic. Since both the transmitter and the corresponding receiver are designed to operate on the same RF duplex channel, the transmitter and receiver can be tested against each other. Such an arrangement reduces the cost of the test equipment, because no extra receiver or transmitter is needed (the RF frequency just has to be transposed by using a mixer) to test the base station transmitter and its corresponding receiver.

In a digital mobile system such as the GSM type employed in Europe or the TDMA systems being introduced in the United States, the base station transmitter transmits a RF carrier signal having a plurality of downlink messages assigned to a plurality of different time slots or "channels", while the base station receiver receives a different RF carrier signal having a plurality of uplink messages assigned to different "channels". Because the time slots of the transmitter and receiver are offset from each other in time, a time slot of the transmitter can not be directly linked to the same time slot of a receiver. Because the base station transmitter and receiver are operating at different RF carrier frequencies and on different channels, a radio test loop cannot be easily established between the transmitter and receiver of a base station.

In some TDMA systems, the problem is even more difficult, because the channels may use a multitude of RF carriers, i.e., the channels are so-called frequency hopping channels. If an ordinary traffic transmitter in a frequency "hopping" system is used as part of a radio test loop, such a radio test loop would cause interference with all "channels" hopping to the RF carrier signal being tested.

Accordingly, there is a need for a method of testing a base station using a low cost radio frequency test loop that does not require any additional expensive signal processing equipment.

SUMMARY OF THE INVENTION

The present invention provides a method of testing a base station of a digital cellular telephone system using a low cost radio frequency test loop that does not require any additional expensive signal processing equipment. The test loop is in real time, thereby eliminating the time offset of the radio channels used for communications. The base station, which is of a type commonly found in a time division multiple access radio communications system, transmits and receives RF carrier signals that are divided into a plurality of frames and time slots for uplink and downlink communications. The time slots correspond to channels. The base station transmitter transmits a RF carrier signal from the base station during a predetermined downlink time slot. The RF carrier signal from the transmitter is coupled to a radio frequency test loop circuit. The radio frequency test loop circuit transposes the RF carrier frequency of the transmitter to a RF carrier frequency capable of being received by the receiver of the base station during a predetermined uplink time slot. The received RF carrier signal can then be tested to determine the bit error rate (BER), the transmission signal level, the reception sensitivity or whatever test is deemed appropriate.

DETAILED DESCRIPTION OF THE PREFERRED EMBODIMENTS

The method and apparatus of the present invention provides a low cost solution to the problem of implementing a radio frequency test loop in the base station of a TDMA type cellular telephone system. The radio frequency test loop is specifically designed to affect only two of the channels on a time division multiple access RF carrier signal pair.

Figure 1:
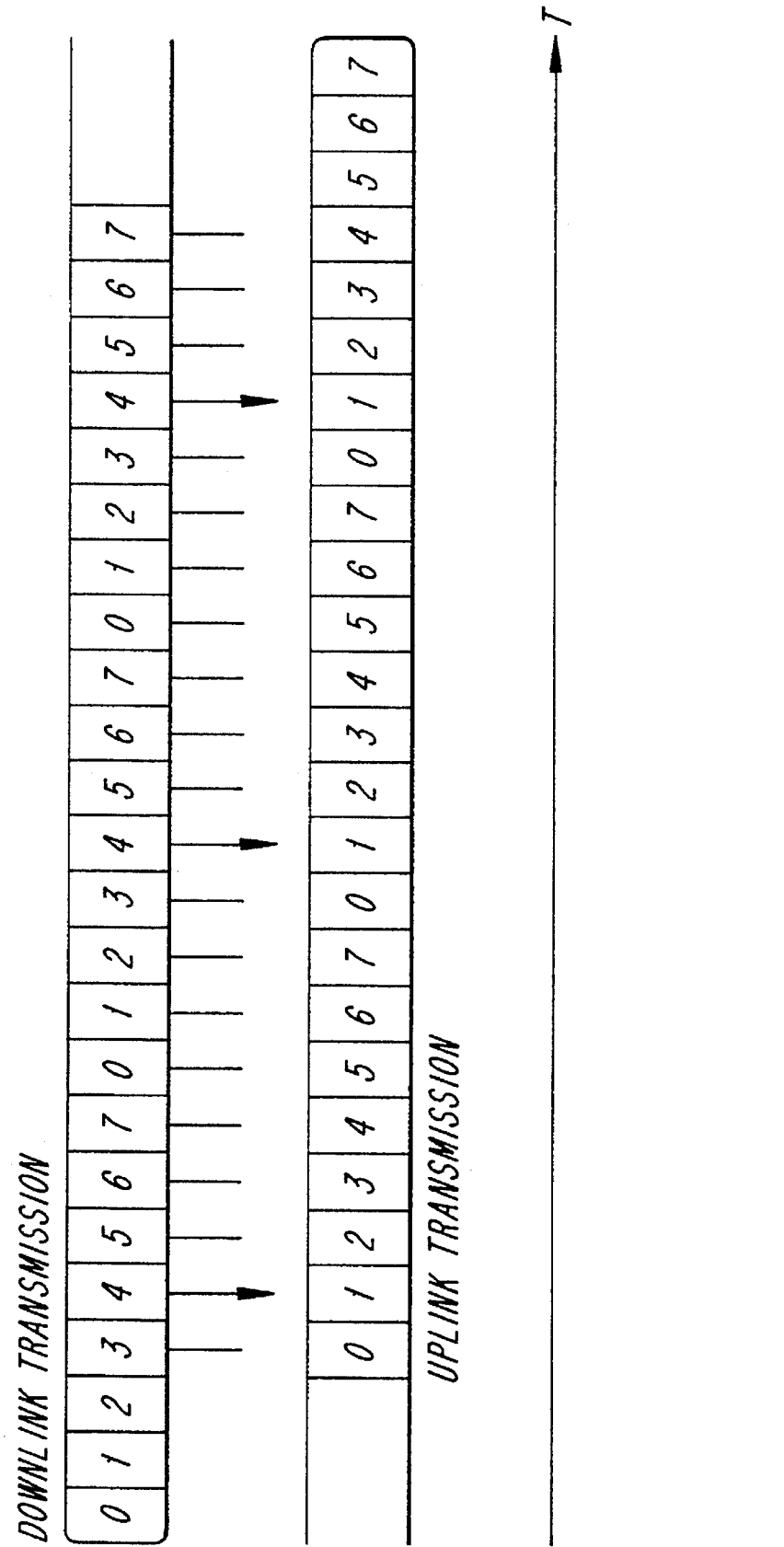
FIG. 1 is a diagram of the downlink times slots of a transmitter and the uplink time slots of a receiver in the base station of a digital cellular telephone system.

Referring now to FIG. 1, a diagram illustrates the frames and time slots of a time division multiple access RF carrier signal pair of the type found in the GSM system. In FIG. 1, the RF carrier pair is divided into frames which are further subdivided into time slots. The downlink transmission, which ordinarily involves the transmission of a RF carrier signal from the base station to mobile stations, is divided into a plurality of frames having eight time slots #0 to #7, for serving up to eight mobile stations. The uplink transmission, which ordinarily involves the transmission of a RF carrier signal from the mobile stations to a base station, is also divided into a plurality of frames having eight time slots #0 to #7, but the uplink time slots are offset from the downlink time slots by approximately three time slots. The testing of a digital TDMA system, such as a GSM system, is further complicated because it might imply that eight channels will be unable to be used for traffic during the test. This is because each of the TDMA slots is normally capable of being used for a speech call. To avoid this unavailability problem, the loop has to be discontinuous in time. As mentioned above, in the GSM system the downlink TDMA frame and the uplink TDMA frame are separated in time by three time slots. This fact could be taken care of by a delay function within the test loop device in order to relay the information into the appropriate time slot in the uplink direction. However, this problem can be avoided by using during testing two simultaneous time slots belonging to different communications channels. A possible drawback of this arrangement is that only six time slots are available for traffic during the test, but this arrangement significantly reduces the complexity and the cost of the test loop. In order not to complicate the test loop with a delay function, the test loop will link a predetermined downlink time slot such as #4 with the uplink time slot appearing at the same point of time #1 to form the radio frequency test loop.

The radio frequency test loop must be able to close the loop for only one of the predetermined time slots in each TDMA frame. Since the RF carrier frequency of the downlink transmission from base station transmitter is intentionally designed to be different from the RF carrier frequency of the uplink transmission received by the base station receiver, the present invention must transpose the band of the RF carrier signal from the base station transmitter to a band which can be received by the base station receiver. When the present invention is employed in a frequency "hopping" system, the radio frequency test loop must also be capable of executing the frequency hopping scheme of the downlink transmission. Moreover, when transposing the signal to the frequency of base station receiver, the frequency hopping scheme of the uplink time slot must also be applied. The test which is being considered here is the looping of one single time slot. Several such tests may be used if required, the tests being in sequence or at intervals. For each test the frequency hopping sequences up and downlink have to be taken into account.

Figure 2:
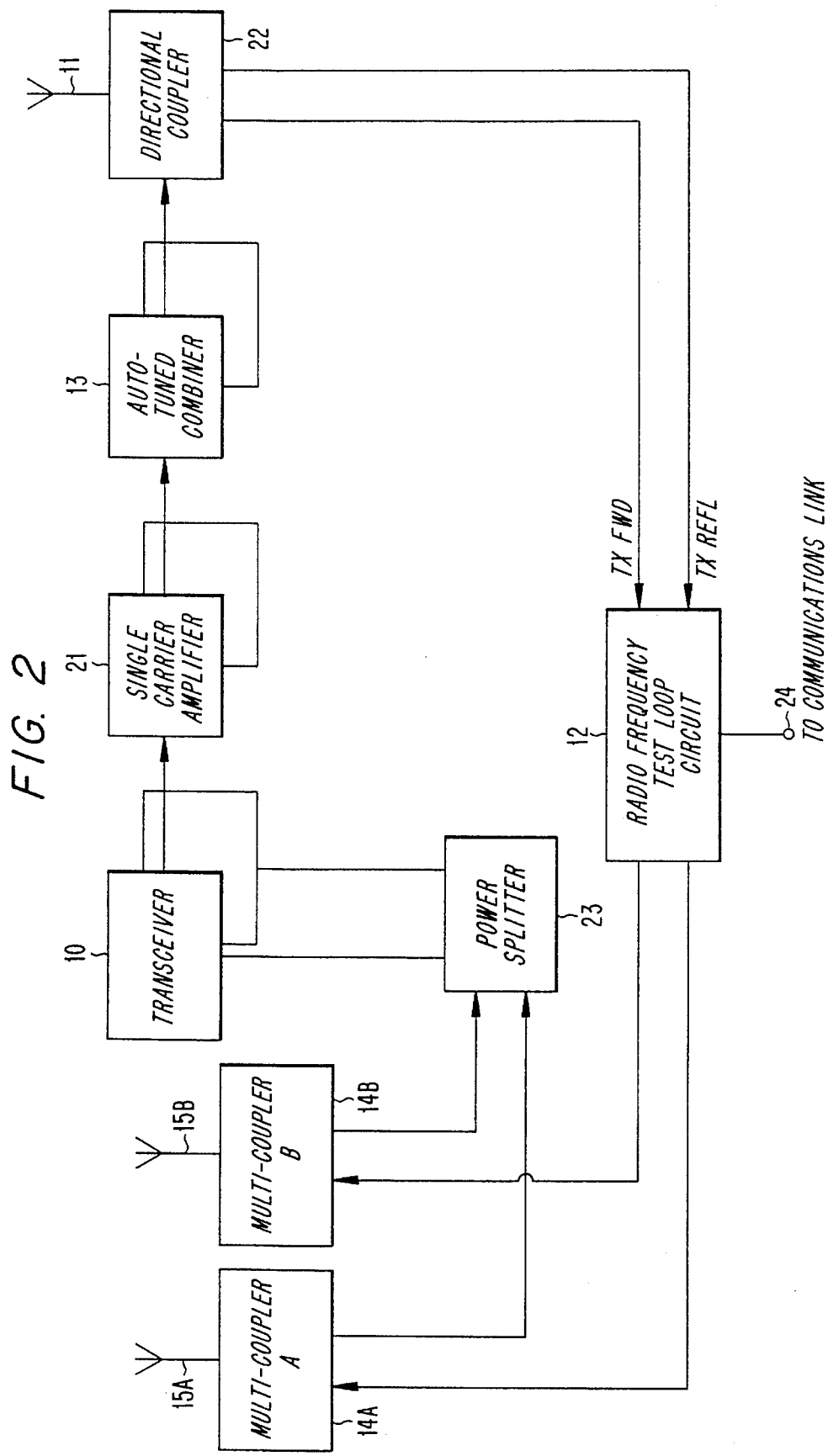
FIG. 2 is a block diagram of the radio frequency test loop of the present invention, and the test loop can also be implemented with the TRX (transceiver)

Referring now to FIG. 2, a block diagram illustrates a base station and the radio frequency test loop 12 of the present invention. The radio frequency test loop includes the circuit board 12 which is used for the calibration, verification and supervision of transmitter and receiver hardware. The circuit board, which is common for all transceivers in the base station, is preferably located in a separate shielded box. The functions which can be performed by the radio frequency test loop include testing of the transmitter-receiver loop, power management, received signal strength indication (RSSI), and return loss calculation. The functions can alternatively be integrated on the TRX board. FIG. 2 illustrates how the radio frequency test loop circuit 12 interacts with other components of the base station. The typical digital base station includes a plurality of transceivers (TRX) 10 which are coupled to the transmitter antenna 11 via their single carrier power amplifiers 21 and their auto-tuned combiners 13. Alternatively, the transmitters could be directly coupled to the auto-tuned combiners 13 without single carrier amplifiers 21, or a multiple carrier power amplifier can be used instead of the single carrier power amplifiers 21 and auto-tuned combiners 13. Alternatively, 3 db hybrid combiners may be used instead of auto-tuned filter combiners.

A directional coupler 22 is coupled between the transmitter antenna 11 and the auto-tuned combiners 13. The directional coupler allows a signal TX REFL and a signal TX FWD, corresponding to the total forward and reflected RF spectrum, to be coupled to the radio frequency test loop circuit 12. The reflected signal is intended for a VSWR (voltage standby wave ratio) calculation, and it is not included in the loop. In the embodiment of the invention illustrated in FIG. 2, the output of the transmitter portion and the input of the receiver portion are illustrated as being coupled to the test loop circuit 12 via couplers 22, 14A, 14B. It is possible, however, that coupling could occur via air rather than the couplers 22, 14A, 14B.

The output signals from radio frequency test loop 12 are applied to the receiver input paths via multi-couplers 14A and 14B. It should be noted that the signals from the test loop are not applied to the receiver antenna, but in parallel with the signals from the antenna. The multi-couplers 14A, 14B feed signals to the transceivers 10 via a power splitter 23. The radio frequency test loop 12 includes an output terminal 24 which is coupled to a communications link. The communications link allows the radio frequency test loop to communicate with a control function. The radio frequency test loop is capable of setting up a loop through any transceiver 10 and for any carrier frequency of the base station. Preferably, the carrier frequency or channel number is defined in a control signal.

Figure 3:
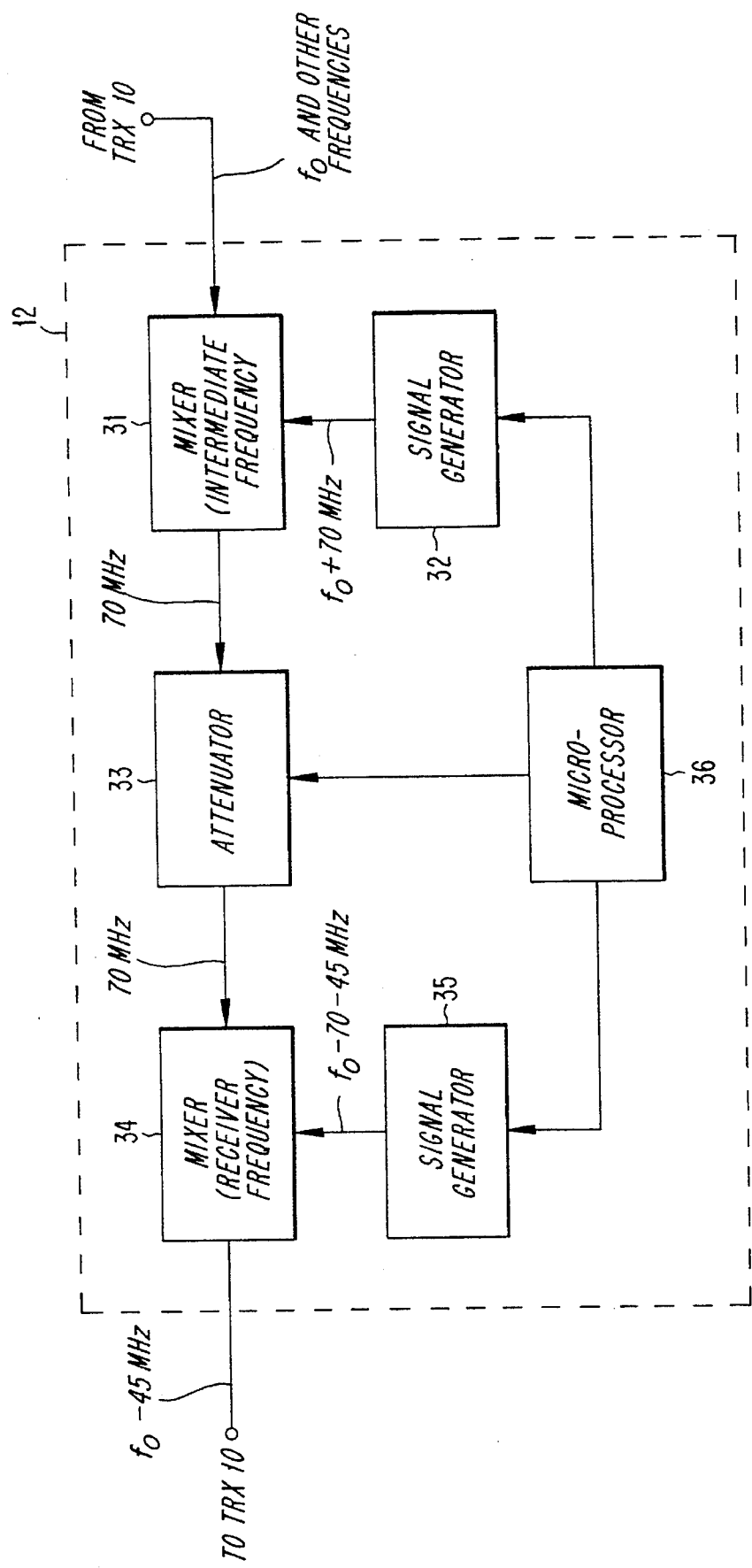
FIG. 3 is a block diagram of a circuit board for transposing the frequency of the transmitter signals.

Referring now to FIG. 3, a block diagram of the circuit board 12 is provided. The circuit board 12 includes a mixer 31 which mixes the transmitter output signal of TRX 10 with a signal from a signal generator 32 and transforms the signal to an intermediate frequency. The intermediate frequency signal is attenuated by an attenuator 33 and applied to a second mixer 34. The mixer 34 mixes the attenuated intermediate frequency signal with a signal from a signal generator 35 in order to transform the signal into a signal having the same band as that of the receiver in the radio frequency test loop. The signal generators 32,35 are under the control of a microprocessor 36. The signal generators 32, 35 are precise signal generators that can be tuned to any of the receiver frequencies of the base station. The output signal from the mixer 34 is fed from the circuit 12 to the transceiver 10 via the multicouplers 14A, 14B, where it is applied to receiving filters of the multicouplers. The signal mixing by mixers 31, 34 is preferably performed without inverting the signal.

The operation of the circuit 12 will now be explained in greater detail. The sent and looped test signal ($f_o$) along with other frequencies is first filtered then mixed by the mixer 31 with a frequency ($f_o$)+70 MHz provided by the signal generator 32. This results in the selection of a particular radio frequency ($f_o$) and the generation of an intermediate frequency of 70 MHz. The intermediate frequency signal is very strong, because it has not experienced the attenuation of the radio path. There is, however, a 40 db attenuation in the directional coupler 22. Accordingly, the intermediate frequency signal is attenuated by the attenuator 33. The looped signal is then transposed to the frequency band of the uplink signal which in the GSM system is 45 MHz lower than the downlink frequency band. The mixer 34 transposes the looped signal by mixing it with the frequency ($f_o$−70−45 MHz) from the signal generator 35. The microprocessor 36 orders the attenuator 33 and the signal generators 32, 35 to the required values.

Figure 4:
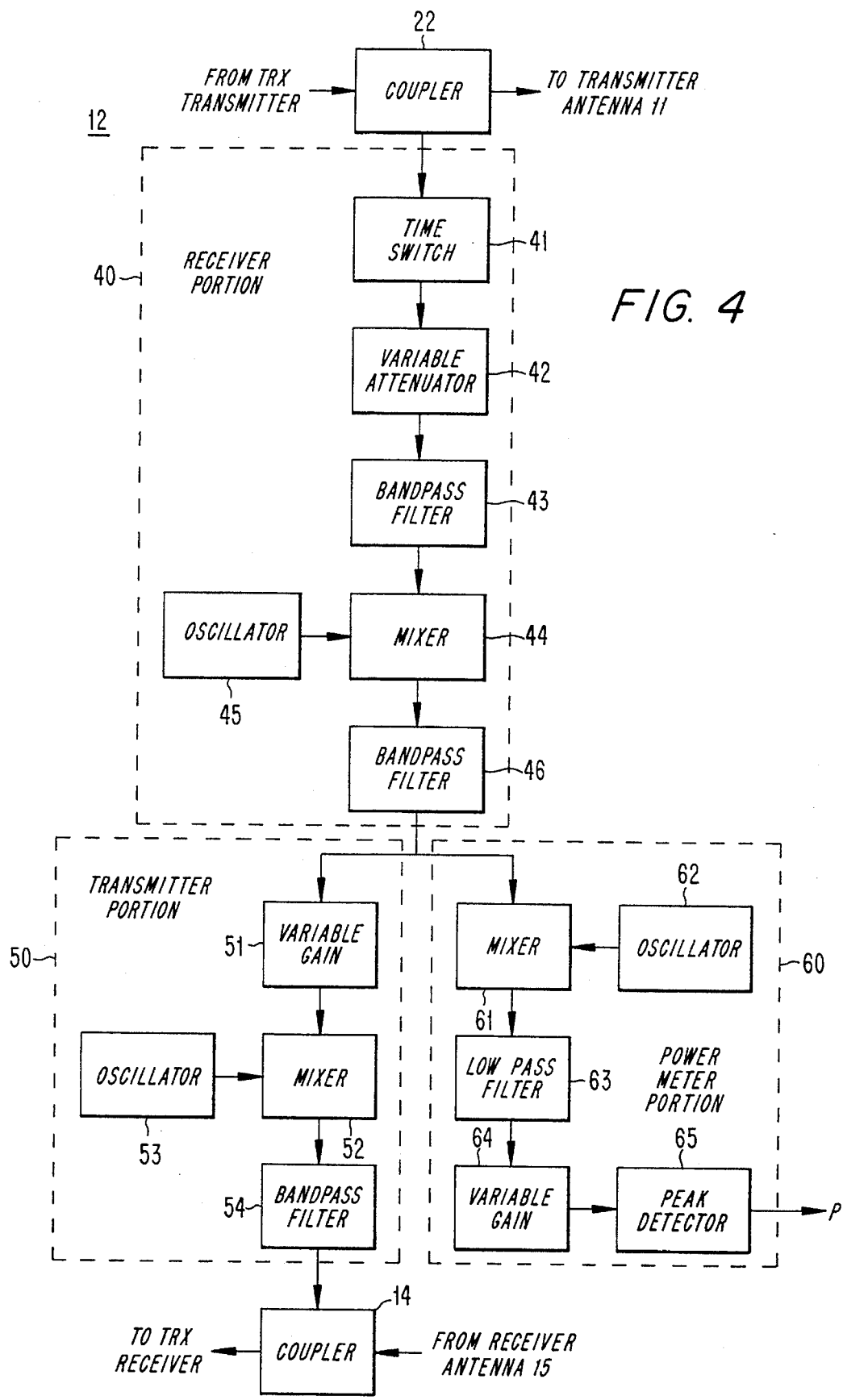
FIG. 4 is a more detailed block diagram of the radio frequency test loop of the present invention.

Referring now to FIG. 4, a block diagram illustrates in more detail the radio frequency test loop of the present invention. The test loop of FIG. 4 is subdivided into a receiver portion 40, a transmitter portion 50 and a power meter portion 60.

The receiver portion 40 includes a time switch 41 which is connected to the coupler 22 and a variable attenuator 42. The output of the variable attenuator 42 is filtered by a bandpass filter 43. (the bandpass equals the total transmitted frequency band). A mixer 44 mixes the output of the bandpass filter 43 with a signal from an oscillator 45. The output from the mixer 44 is filtered by a second bandpass filter 46 (the center frequency equals the intermediate frequency, and the bandwidth equals the bandwidth of a single carrier), and the output is applied to the transmitter portion 50 and the power meter portion 60.

The transmitter portion 50 includes a variable gain amplifier 51 which amplifies the output from the receiver 40. A mixer 52 mixes the output of the variable gain amplifier 51 with a signal from an oscillator 53. The output of the mixer 52 is filtered by a bandpass filter 54 (the passband equals the total receiver frequency band), and this output is applied to the coupler 14.

The power meter portion 60 is coupled to the output of the second bandpass filter 46. The power meter portion 60 includes a mixer 61 which mixes the output of the bandpass filter 46 with a signal provided by an oscillator 62. The output of the mixer 61 is filtered by a low pass filter 63 and amplified by a variable gain amplifier 64. A peak detector 65 detects a predetermined peak in the output of the variable gain amplifier 64 and outputs a signal P.

The system software provides a set-up of the test loop within the system illustrated in FIG. 4. The loop can either be set up at times of little traffic or on command from the system operator. The present invention may also be configured to automatically set up a test loop depending upon traffic density. When it is decided that a loop is to be connected for test purposes, the time switch 41 of the receiver portion 40 is activated. The time switch 41 is open only for the predetermined time slot to be looped. All other time slots are transmitted as usual.

The signal in the selected time slot is then attenuated by the variable attenuator 42 and filtered by the bandpass filter 43. When performing this function, the system takes into consideration that the output of the bandpass filter 43 may differ due to various factors. These factors include 1) different configured cell radius (e.g., several overlaid/underlaid cells within the range of the base station), 2) variations from frequency hopping aspects (i.e., in the GSM system, when hopping on carrier "0" the power may vary), and 3) dynamic base station output power regulation which may be relevant if traffic is used as the downlink test stimuli. It should be noted that the carrier "0" is the frequency (in the GSM system) that carries command channels (FCCH/SCH/BCCH/CCCH) and defines the cell. The GSM systems requires that the transmission on the "0" carrier be continuous and have constant power. The software controlling the loop, therefore, has an attenuation algorithm operating on the variable attenuator 42. When frequency hopping is utilized in connection with the present invention, the frequency hopping may cause a rapid change in output power, and therefore, the carrier "0" frequency must be known together with the frequency hopping algorithm.

If the frequency hopping algorithm is aware of the supposed cell output power, it can use the cell output power as input into the algorithm. This arrangement allows the output power of the transceiver 10 to be checked. Since the time slot channel may hop in the frequency domain, the test loop takes this into consideration as previously mentioned. This may be accomplished by controlling the first oscillator 45 and mixer 44. The oscillator 45 can be controlled to hop according to the hopping algorithm of the downlink time slot channel. Such an arrangement results in a signal on the selected time slot, which has a given frequency and a given power.

Since the signal is looped back into another time slot channel, this channel may hop differently from the downlink time slot channel. Accordingly, there is a need for the oscillator 53 mixer 52 combination which is operated according to the uplink channel hopping algorithm to which the signal is connected.

A pseudo-code function to achieve the above-described function may be as follows:

```
IF loop is to be connected THEN,
    Set up time switch 41 to open for the selected time slot,
    FOR each TDMA frame DO,
            Calculate downlink frequency from the
            hopping algorithm,
            Set first oscillator 45 according to downlink
            frequency,
            Calculate uplink frequency from the hopping
            algorithm,
            Set second oscillator 53 according to uplink
            frequency,
            If carrier 0 frequency THEN,
                Set attenuation to Pc-Pr,
            ELSE,
                Set attenuation to Pn-Pr,
            ENDIF,
            Measure the power of the time slot signal
            with power meter 60,
            IF measurement was above expected value
            THEN,
                Decrease Pr,
            ENDIF,
            IF measurement was below expected value
            THEN,
                Increase Pr,
            ENDIF,
    ENDFOR.
```

Pc = Power of Carrier 0, Pn = Cell output power, Pr = Regulator power

It should be noted that in the case of a system without frequency hopping, the test loop can be further simplified by removing one of the oscillator/mixer combinations. It should also be noted that when looping downlink time slots 0, 1, and 2, the relayed signal will appear in the uplink direction in another TDMA frame. This fact must taken into account for the TRX receiver function when testing.

It is also possible that instead of frequency hopping, the downlink channel may time hop. In other words, instead of being assigned to a particular time slot, e.g. time slot #5. and hopping to different frequencies, the downlink channel may hop from a first time slot to another time slot, e.g. from time slot #5 to time slot #3. Accordingly, the test loop of the present invention may be configured to adapt to a time slot hopping scheme, as well as a frequency hopping scheme.

Since the TRX receiver may receive signals from both the antenna 15 and the test loop 12, the power from which the relayed signal is generated must be controlled. This is because the interference signal received on the receiver antenna 15 is dependent on the total system C/I budget. The TRX receiver function can be implemented in two different ways. The first way employs the coupler 14 to connect both receiver antenna 15 and the loop signal to the receiver function. The second way is to employ a switch that connects only one signal at a time. Since the C/I figure may vary with time, it may be preferable to perform measurement of the background interference level prior to and after the loop test. In other words, it is desirable that before and after performing a test using the test loop, a check of the background interference level is performed in order to get a picture of the test interference level generated by other cells in the system.

Figure 5:
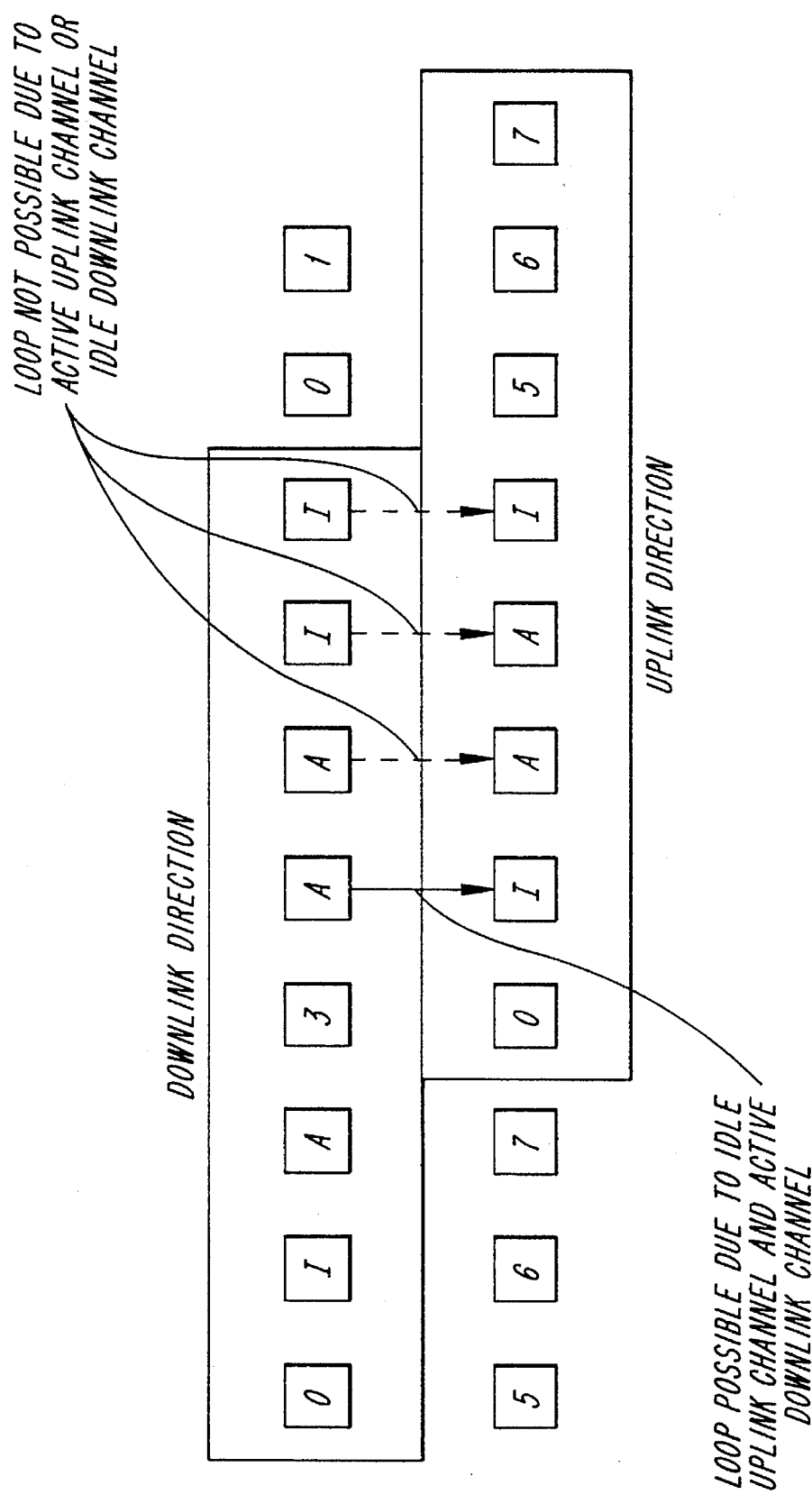
FIG. 5 is a diagram of the downlink time slots of a transmitter and the uplink time slots of a receiver having active and idle time slots.

When using normal traffic as the downlink test stimuli, there is a need for an algorithm within the TRX 10 for setting up the test loop. This algorithm can be based upon the actual use of the time slot channels within the TRX 10. Each time slot channel can be said to be either active (call in progress) or idle (no traffic). This state applies to both the uplink and downlink part of the time slot channel. FIG. 5 illustrates time slots in the uplink and downlink directions. The active time slots are designated A, and idle time slots are designated I. In FIG. 5 there is one possible loop using normal traffic as the downlink test stimuli and three loops which are not suitable for use as the downlink test stimuli. Accordingly, in the situation depicted in FIG. 5, the algorithm associated with the TRX 10 permits a test loop when the downlink channel is active and the matching uplink channel is idle.

Figure 6:
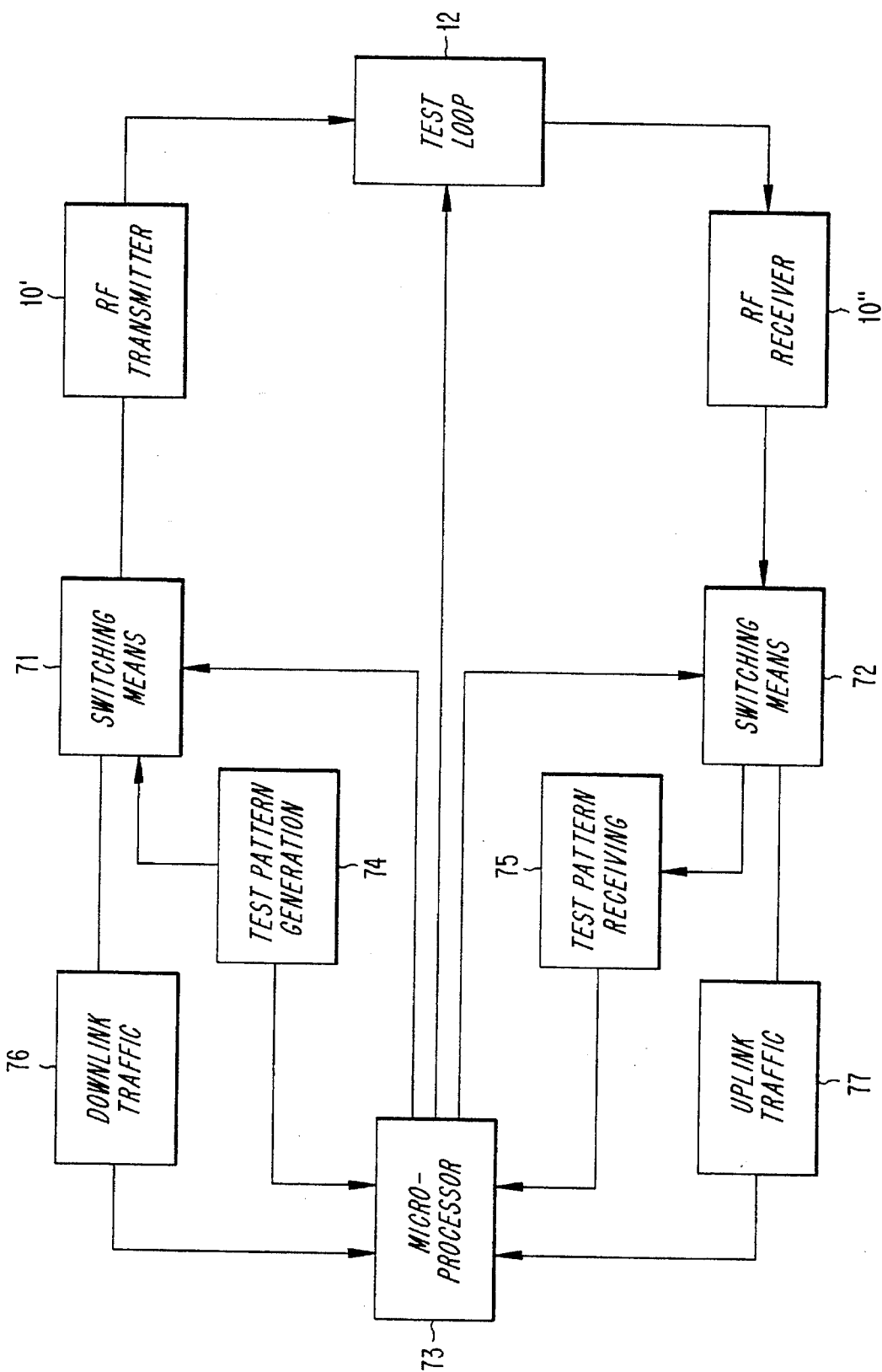
FIG. 6 is a block diagram of an embodiment of the radio frequency test loop that utilizes stored test patterns.

The present invention is not limited to the use of an actual traffic channel as the test stimuli. The present invention can be adapted to use a stored test pattern as the test stimuli. There are, however, some differences when using a stored test pattern in the American Digital Cellular (ADC) system described in IS-54-A standard and the GSM system implemented in Europe. FIG. 6 illustrates how such a test pattern could be used in either the ADC or GSM systems. The test loop 12 illustrated in FIG. 6 is disposed between the transmitter 10' and the receiver 10" of the TRX 10. The transmitter 10' and the receiver 10" are coupled respectively to switching means 71, 72. A microprocessor 73 controls the test loop 12, the switching means 71, 72, test pattern generation means 74, test pattern receiving means 75, downlink traffic 76 and uplink traffic 77.

In the American Digital Cellular system, the bit format of the downlink and uplink bursts is different, and therefore, normal traffic cannot be directly looped for test purposes. Instead, special test patterns can be stored in the test pattern generation means 74 of the transceiver 10 performing the test. These test patterns should follow the standard of the uplink bit format. The timing difference between the downlink and uplink of the radio channels is one time slot and forty-five symbols as described in the IS-54-A standard. When the transceiver 10 transmits a test burst, the burst has to be delayed relative to the transmitted traffic bursts by this amount of time. This does not cause any additional complexity, since the test burst are stored in the test generation means 74. During a test, a whole radio channel is blocked for the test. This means that an entire frequency and its three time slots are unavailable for traffic. This is because two channels are required for testing and the third one is overlapped on the sending side by the test burst not coinciding with traffic burst limits.

In the European GSM system, the format of the downlink and uplink bursts is the same. Prestored test patterns as well as real traffic can be used as stimuli for the test loop. The timing difference between the downlink and uplink of radio channels is exactly three time slots which means that looping one connection blocks two channels from traffic, if prestored test patterns are used. Only one channel, however, is blocked, if live traffic is used for the test. The other six or seven channels on the radio frequency may be used for traffic while testing. Because of this the RF loop may include a time switch that provides a loop only at the time desired.

The radio frequency test loop of the present invention is particularly well suited for performing the function of power measurement. Power measurement is performed, when requested, via the communications link 24, a measurement of the forward power for any of the carrier frequencies of the base station. The carrier signal can be either modulated or unmodulated. In the case of a modulated carrier signal the power level may be the same in all time slots. The carrier frequency (channel number) and the type of modulation is defined by a control signal. When measuring power, the cable between the directional coupler 22 and the radio frequency test loop circuit 12 and the directional coupler are considered as one unit, and the circuit board 12 is not matched to the cable and the directional coupler. A power value is calculated in dBm, and it is reported. This power value refers to the output of the directional coupler 22.

The radio frequency test loop circuit 12 is also capable of generating any of the carrier frequencies of the base station as a reference signal for the calibration of RSSI (received signal strength indicator). The carrier frequency (channel number) is defined by a control signal. The reference signal is then generated as an unmodulated carrier, and it is fed to the multicouplers 14. Another control signal is received when the reference signal from the circuit 12 is to be turned off.

The radio frequency test loop circuit 12 can also be used in the calculation of a return loss. The return loss is calculated on a modulated or an unmodulated carrier, and it is possible to request a return loss calculation for a specific or arbitrary carrier frequency (channel number). When the radio frequency test loop is idle, the return loss is calculated continuously, and if the return loss is out of range, the radio frequency test loop sends an alarm. Preferably, before sending an alarm, the radio frequency test loop calculates the return loss for more than one carrier signal. There are two classes of alarms, minor or serious, which are established by alarm thresholds. These thresholds can be changed by commands. The radio frequency test loop reports the calculated return loss values via the communications link 24.

The method and apparatus of the present invention provide a solution to the problem of testing the base station transceiver of a digital cellular telephone system at the time of installation or during operation of the system. This solution requires only a minimum of hardware dedicated to the radio test loop, thereby eliminating the need for expensive signal processing equipment and providing a cost effective and space saving solution to the testing problem.

While the present invention has been described in its preferred embodiments, it is to be understood that the words used are words of description rather than of limitation, and that changes to the purview of the present claims may be made without departing from the true scope of the invention in its broader aspects.

What is claimed is:

1. A method for testing a base station of a time division multiple access radio communications system of the type having carrier signals divided into a plurality of frames and time slots for uplink and downlink communications, the uplink and downlink time slots having a time offset therebetween during a non-test mode, comprising the steps of:

establishing a loop between a predetermined downlink time slot and a predetermined uplink time slot during a test mode, the predetermined downlink time slot and the predetermined uplink being simultaneous in time only during the test mode;

transmitting a signal from a transmitter of the base station during the predetermined downlink time slot, the signal from the transmitter being a test stimuli;

transposing the frequency of the signal from the transmitter to a frequency that is receivable by a receiver of the base station during the predetermined uplink time slot; and performing a test with the signal having the transposed frequency that is received by the receiver.

2. A method according to claim 1 wherein the transposing step includes mixing the signal from the transmitter with a signal having a first predetermined frequency in order to generate a signal having an intermediate frequency, variably attenuating the intermediate frequency signal, and mixing the attenuated intermediate frequency signal with a signal having a second predetermined frequency in order to generate the signal receivable by the receiver.

3. A method according to claim 1 wherein the test stimuli corresponds to normal traffic.

4. A method according to claim 1 wherein the test stimuli corresponds to a prestored pattern.

5. A method according to claim 1 wherein the signal from the transmitter is a frequency hopping signal and the transposing step is performed in accordance with an algorithm which matches the frequency hopping scheme of the signal.

6. A method according to claim 1 wherein the signal from the transmitter has a downlink frequency hopping scheme which is different from an uplink frequency hopping scheme of the receiver.

7. A method according to claim 1 wherein the signal from the transmitter is a time slot hopping signal and the transposing step is performed in accordance with an algorithm which matches the time slot hopping scheme of the signal.

8. A method according to claim 1 wherein the signal from the transmitter is transmitted to the receiver via couplers.

9. A method according to claim 1 wherein the signal from the transmitter is transmitted to the receiver via antennas.

10. A method according to claim 1 wherein the base station includes processing means that causes the automatic set up of the loop between the downlink time slot and the uplink time slot depending upon traffic density.

11. A method according to claim 1 wherein when it is decided that a loop is to be connected for test purposes, a switching step is performed to cause the predetermined downlink time slot to be looped with the predetermined uplink time slot, leaving the other time slots unaffected.

12. A method according to claim 1 wherein the loop is capable of adapting to different downlink power levels.

13. A method according to claim 1 wherein the predetermined downlink time slot is automatically linked to the predetermined uplink time slot when the predetermined downlink is active and the predetermined uplink time slot is idle.

14. A method according to claim 1 wherein before and after the step of performing a test, a check of the background interference level is performed in order to get a picture of the test interference level generated by other cells in the system.

15. A method according to claim 1 wherein the performing of a test includes a power measurement of the signal transmitted from the transmitter.

16. A method according to claim 1 which further includes a calibration of a received signal strength indication of the signal transmitted from the transmitter.

17. A method according to claim 1 which further includes a return loss calculation of the signal transmitted from the transmitter.

18. A method according to claim 1 which further includes a bit error rate determination of the signal transmitted from the transmitter.

19. A method according to claim 1 wherein the performing of a test includes a determination of signal transmission level.

20. A method according to claim 1 wherein the performing of a test includes a determination of reception sensitivity.

21. A radio frequency test loop apparatus for testing a base station of a time division multiple access radio communications system of the type having carrier signals divided into a plurality of frames and time slots for uplink and downlink communications, the uplink and downlink time slots having a time offset therebetween during a non-test mode, the base station including at least one transmitter and receiver, comprising:

means for directionally coupling an-output signal of the transmitter during a predetermined downlink time slot, the output signal of the transmitter being a test stimuli;

a test loop circuit, coupled to the directional coupling means, for transposing the frequency of the output signal from the transmitter to a frequency capable of being received by the receiver of the base station during a predetermined uplink time slot; and means for coupling the output of the test loop circuit to the receiver, such that the predetermined downlink time slot and the predetermined uplink time slot are looped;

wherein the predetermined downlink time slot and the predetermined uplink time slot are simultaneous in time only during a test mode, and a test is performed using the signal having the transposed frequency.

22. An apparatus according to claim 21 wherein the test loop circuit includes first means for mixing the signal from the transmitter with a signal having a predetermined frequency in order to generate a signal having an intermediate frequency, and second means for mixing the signal having the intermediate frequency with a signal having a second predetermined frequency in order to generate the signal having a frequency that is receivable by the receiver.

23. An apparatus according to claim 22 wherein the test loop circuit further includes means for variably attenuating the signal from the first mixing means.

24. An apparatus according to 21 which further includes means for measuring the power of a signal from the test loop circuit.

25. An apparatus according to claim 23 wherein the test loop circuit further includes signal generating means for providing signals to the first and second mixing means.

26. An apparatus according to claim 21 which further includes a time switch that causes the predetermined downlink time slot to be looped with the predetermined uplink time slot, leaving the other time slots unaffected.

* * * * *